United States Patent [19]

Besso

[11] Patent Number: 4,939,237

[45] Date of Patent: Jul. 3, 1990

[54] PREPARATION OF HIGH VISCOSITY NYLON WITH P CATALYST COMPOSITION

[75] Inventor: Erica M. Besso, Manotick, Canada

[73] Assignee: du Pont Canada Inc., Mississauga, Canada

[21] Appl. No.: 266,879

[22] Filed: Nov. 2, 1988

[30] Foreign Application Priority Data

Nov. 3, 1987 [GB] United Kingdom ............... 8725745

[51] Int. Cl.$^5$ ............................................ C08G 69/48
[52] U.S. Cl. .................................. 528/487; 264/131; 264/348; 524/135; 524/414; 524/417; 524/606; 525/420
[58] Field of Search ................ 525/420, 419; 528/487; 524/135, 414, 417

[56] References Cited

U.S. PATENT DOCUMENTS

| | | | |
|---|---|---|---|
| 2,705,227 | 3/1955 | Stamatoff | 260/45.7 |
| 3,340,339 | 9/1967 | Ullman | 264/131 |
| 3,551,548 | 12/1970 | Brignac et al. | 528/339 |
| 4,390,667 | 6/1983 | Aharoni et al. | 525/420 |
| 4,433,116 | 2/1984 | Largman et al. | 525/420 |
| 4,471,081 | 9/1984 | Bander et al. | 523/313 |
| 4,543,407 | 9/1985 | Curatolo et al. | 528/336 |

FOREIGN PATENT DOCUMENTS 766291 8/1967 Canada ................................ 400/57

Primary Examiner—Harold D. Anderson

[57] ABSTRACT

A process for producing a polyamide with a relative viscosity of at least 100 is disclosed. The process comprises adding a catalyst selected from the group consisting of ortho-phosphoric acid, meta-phosphoric acid, alkali-metal hypophosphite and phenylphosphinic acid to the polyamide, which has a relative viscosity of from 30 to 70, mixing the catalyst and polyamide at a temperature above the melting temperature of the polyamide under reduced pressure and for a time sufficient to increase the relative viscosity of the polyamide to at least 100, and extruding the resulting polyamide into shaped form and quenching said polyamide. The catalyst is present in amounts of at least 0.01 wt. % and increases in relative viscosity may develop in times as short as about one minute.

10 Claims, No Drawings

PREPARATION OF HIGH VISCOSITY NYLON WITH P CATALYST COMPOSITION

The present invention relates to toughened nylon, specifically nylon with a high relative viscosity, and a method for making such nylon.

The use of phosphorus compounds in nylon compositions is well known.

In U.S. Pat. No. 4 543 407 which issued Sept. 24, 1985 Curatolo et al. disclose a process for manufacturing nylons from diamines and diamides, utilizing a catalyst system composed of an oxygenated phosphorus compound.

In U.S. Pat. No. 2 705 227 which issued Mar. 29, 1955 G. S. Stamatoff discloses a stabilizer for synthetic linear polyamides prepared from polymerizable mono-aminocarboxylic acids, their amide-forming derivatives, or suitable diamines and dicarboxylic acids. The stabilizer comprises a copper compound and a halogen compound, optionally containing a phosphorus compound. The phosphorus compound is in the amount of from 0.1% to 1% by weight based on the weight of the polyamide. Stamatoff discloses adding the stabilizer to the polyamide salt solution prior to polymerization in an autoclave. Suitable phosphorus compounds included phosphorous acid, phosphoric acid, sodium phosphites and phosphates, and certain alkyl and aryl phosphites and phosphates.

In U.S. Pat. No. 4 471 081 which issued Sept. 11, 1984 Bander et al. disclose continuous polymerization of caprolactam in the presence of free water and a nonmetallic catalyst capable of generating phosphoric acid.

In U.S. Pat. No. 3 340 339 which issued Sept. 5, 1967 J. G. Ullman discloses the addition of a phosphinate to polyamide-forming reactant under condensation temperature-pressure conditions, extruding, cutting and extrusion into flake, coating the flake with a finely divided particulate material, melting the coated flake, extruding the molten polymer to form filaments and quenching and drawing the filaments. The phosphinate was an alkali metal alkyl, cycloalkyl, aryl or arylalkyl phosphinate.

In Canadian Patent No. 766 291 which issued Aug. 29, 1967 E. P. Brignac discloses a process for producing nylon polymer having a relative viscosity greater than 70. Relative viscosities of about 75 are exemplified. In such process, molten nylon polymer, which has a relative viscosity of not greater than about 25, and to which has been added at least 0.01 weight percent of a phosphorus compound, is fed into a polymer finishing zone of a finisher. In addition, inert gas is used to "sweep" the melt in the finisher.

As used herein with respect to the present invention, relative viscosity is the ratio of viscosity at 25° C. of an 8.4 wt. % solution of the nylon in 90 wt. % formic acid (90 wt. % acid to 10 wt % water) to the viscosity at 25° C. of the 90 wt. % formic acid alone.

The present invention provides a process for producing a polyamide with a relative viscosity of at least 100, comprising:

(a) adding a catalyst selected from the group consisting of ortho-phosphoric acid, meta-phosphoric acid, alkali-metal hypophosphite and phenylphosphinic acid to a polyamide, said polyamide having a relative viscosity of from 30 to 70, said catalyst being in an amount sufficient that after processing in steps (b) and (c) the relative viscosity of the resulting polyamide is at least 100;

(b) mixing the catalyst and polyamide at a temperature above the melting temperature of said polyamide under reduced pressure and for a time sufficient to increase the relative viscosity of the polyamide to at least 100;

(c) extruding the resulting polyamide into shaped form and quenching said polyamide.

The polyamide may be aromatic or aliphatic. Aliphatic polyamides are preferred especially polyamides made from an aliphatic dicarboxylic acid and an aliphatic diamine, each having from 2 to 24 carbon atoms, and more especially those having from 6 to 12 carbon atoms.

In one embodiment the catalyst is admixed with a particulate polyamide having a relative viscosity of from 40 to 70 prior to introducing the admixture to an apparatus for melting said polyamide.

In another embodiment a polyamide having a relative viscosity of from 40 to 70 is melted in an extrusion apparatus and the catalyst is added to the molten polyamide.

In a further embodiment the admixture is extruded using an extrusion apparatus and said apparatus is vented such that the pressure that the polyamide experiences is less than about 13 kPa, and especially less than about 8 kPa.

In another embodiment the catalyst is a phosphoric acid in the amount of from 0.01 to 1.5 wt. %.

In a further embodiment the catalyst is ortho- or meta-phosphoric acid in an amount of from 0.05 to 0.2 wt. %.

In another embodiment the polyamide is formed into film using a blown film process.

The present invention also provides a polyamide with a relative viscosity of at least 100, containing a catalyst selected from the group consisting of ortho-phosphoric acid, meta-phosphoric acid, alkali-metal hypophosphite and phenylphosphinic acid, said catalyst being in an amount of at least 0.01 wt. %.

In one embodiment the polyamide is made from an aliphatic dicarboxylic acid and an aliphatic diamine, each having from 2 to 24 carbon atoms, especially those having from 6 to 12 carbon atoms.

In another embodiment the amount of catalyst is a phosphoric acid in the amount of from 0.01 to 1.5 wt. %.

In a further embodiment the catalyst is ortho- or meta-phosphoric acid in an amount of from 0.05 to 0.2 wt. %.

The polyamide may contain additives other than the catalyst. For example pigments, slip and anti-block additives, antioxidants and heat stabilizers and the like may be added depending on the use of the extruded form. For example, copending application No. 07/266,878, filed the same day as this application, describes a release sheet for the manufacture of printed circuit boards, in which a phosphorus-based catalyst and particulate anti-block and heat stabilizing additives are added to certain polyamides prior to extrusion into film form.

The catalyst must be present in amounts of at least 0.01 wt. %, preferably from 0.01 to 3.0 wt. %, and especially from 0.1 to 0.5 wt %.

It has been found that a convenient method for adding a liquid catalyst is to coat particulate polyamide, having a relative viscosity of from 30 to 70, with the catalyst. For example, liquid ortho-phosphoric acid may be coated onto nylon flake. A convenient method for adding a powdered catalyst is to mix such powder with a suitable ground polyamide resin. The blend of polyamide and catalyst may then be fed to an extruder, e.g. a twin-screw extruder, where the blend is melted, extruded into shaped form, e.g. film form, and quenched. It has been found that when the extruder is vented such that the pressure in the extruder is less than about 13 kPa it is possible for the relative viscosity of the polyamide to increase two- or threefold or more compared to the viscosity of the original polyamide. Such an increase may take place within about a minute. This is particularly advantageous because it is not necessary to have long residence times of the polyamide in the molten condition, which may otherwise have contributed to degradation and gel formation. The resulting polyamide tends to have greater temperature resistance, impact strength, tensile strength and flex-crack resistance than the lower viscosity polyamides.

The present process may be used to make film having a relative viscosity of at least 100 using either a so-called flat die, in which case the film is most often cast in sheet form, or an annular die in a so-called blown film process. In a blown film process, molten resin is extruded through the annular die so that the resin is extruded in tubular form. The tube is expanded using a gas, e.g. an inert gas, inside the tube. It is then quenched, often while still expanding the tube. The tube is then collapsed, e.g. between rollers, and the resulting film is slit and wound up into rolls.

The present invention is illustrated by the following examples:

EXAMPLE I

Samples of Zytel 101 (trade mark) nylon 66 resin, which has a relative viscosity of 50, were blended with various quantities of meta-phosphoric acid. Such blends were then extruded into film form, 40 μm in thickness, using a Welding Engineers (trade mark) 20 mm twin screw extruder. The extruder was run at about 285° C. and 6.67 kPa pressure, with a residence time of about 65 seconds. The relative viscosity, ultimate tensile strength and break elongation were measured. The results are shown in Table 1.

TABLE 1

| Run | m-(HPO$_3$)$_n$ Wt. % | RV | UTS MPa | BEL % |
|---|---|---|---|---|
| 1 | 0 | 54 | 47.569 | 271 |
| 2 | 0.025 | 90 | 48.948 | 259 |
| 3 | 0.1 | 137 | 62.047 | 349 |
| 4 | 0.2 | 117 | 65.494 | 238 |
| 5 | 0.35 | 106 | 53.774 | 186 |
| 6 | 0.5 | 83 | 48.948 | 130 |

These experiments show the sensitivity of the process to the concentration of meta-phosphoric acid catalyst. Runs 1, 2 and 6 are outside the scope of the present invention and are included for comparison purposes.

EXAMPLE II

Samples of Zytel 101 (trade mark) nylon 66 resin, which has a relative viscosity of 50, were blended with various quantities of ortho-phosphoric acid. Such blends were then extruded into film form, 40 μm in thickness, using a Welding Engineers (trade mark) 20 mm twin screw extruder. The extruder was run at about 285° C. and 6.67 kPa pressure, with a residence time of about 65 seconds. The relative viscosity, ultimate tensile strength and break elongation were measured. The results are shown in Table 2.

TABLE 2

| Run | o-H$_3$PO$_4$ Wt. % | RV | UTS MPa | BEL % |
|---|---|---|---|---|
| 1 | 0 | 54 | 47.569 | 271 |
| 7 | 0.05 | 125 | 45.501 | 180 |
| 8 | 0.1 | 133 | 51.705 | 173 |
| 9 | 0.2 | 138 | 57.221 | 146 |
| 10 | 0.05 | 192 | 61.357 | 168 |

Run 10 was carried out at a pressure of 1-2 kPa. Run 1 is outside the scope of the present invention and is included for comparison purposes.

EXAMPLE III

Samples of Zytel 42DB (trade mark) nylon 66 resin, which has a relative viscosity of 42, were blended with various quantities of ortho-phosphoric acid. Such blends were then extruded into film form, 40 μm in thickness, using a Welding Engineers (trade mark) 20 mm twin screw extruder. The extruder was run at about 285° C. and 6.67 kPa pressure, with a residence time of about 65 seconds. The relative viscosity, ultimate tensile strength and break elongation were measured. The results are shown in Table 3.

TABLE 3

| Run | o-H$_3$PO$_4$ Wt. % | RV | UTS MPa | BEL % |
|---|---|---|---|---|
| 11 | 0.05 | 192 | 55.152 | 220 |
| 12 | 0.1 | 174 | 51.705 | 169 |

EXAMPLE IV

Samples of Zytel 42DB nylon 66 resin, which has a relative viscosity of 42, were blended with various quantities of sodium hypophosphite. Such blends were then extruded into film form, 40 μm in thickness, using a Welding Engineers (trade mark) 20 mm twin screw extruder. The extruder was run at about 285° C. and 6.67 kPa pressure, with a residence time of about 65 seconds. The relative viscosity was measured. The results are shown in Table 4.

TABLE 4

| Run | Wt. % SHP | RV |
|---|---|---|
| 13 | 0 | 42 |
| 14 | 0.13 | 76 |
| 15 | 0.33 | 98 |
| 16 | 0.65 | 90 |
| 17 | 1.0 | 150 |

Only Run 17 falls within the scope of the present invention.

EXAMPLE V

Samples of Zytel 101 nylon 66 resin, which has a relative viscosity of 50, were blended with various quantities of phenylphosphinic acid (PPA). Such blends were then extruded into film form, 40 μm in thickness, using a Welding Engineers (trade mark) 20 mm twin screw extruder. The extruder was run at about 285° C. and 6.67 kPa pressure, with a residence time of about 65 seconds. The viscosity, ultimate tensile strength and break elongation were measured. The results are shown in Table 5.

TABLE 5

| Run | PPA Wt. % | RV | UTS MPa | BEL % |
|---|---|---|---|---|
| 18 | 0.2 | 90 | 44.811 | 282 |
| 19 | 0.35 | 108 | 47.569 | 225 |
| 1817-87-13 | 0.5 | 139 | 46.190 | 121 |

COMPARATIVE EXAMPLES

A sample of Zytel 42DB nylon 66 resin was blended with 0.2 wt. % manganese hypophosphite and extruded into film having a thickness of 40 μm, using a Welding Engineers 20 mm twin screw extruder. The extruder was run at about 285° C. and 6.67 kPa pressure, with a residence time of about 65 seconds. The relative viscosity of the resulting film was 60, the ultimate tensile strength was 40.675 MPa and the break elongation was 141%. This experiment indicates that not all phosphorus compounds which have been suggested in the prior art as catalysts for polyamides are suitable in the present invention.

I claim:

1. A process for producing a polyamide with a ratio of viscosity at 25° C. as an 8.4 wt. % solution of polyamide in 90 wt. % formic acid to the viscosity at 25° C. of the 90 wt. % formic acid alone of at least 100, comprising:
   (a) adding a catalyst selected form the group consisting of ortho-phosphoric acid, meta-phosphoric acid, alkali-metal hypophosphite and phenylphosphinic acid to a polyamide, said polyamide having a ratio of viscosity as set forth above of from 30 to 70, said catalyst being at least 0.01 wt. % and in an amount sufficient that after processing in steps (b) and (c) the aforesaid ratio of viscosity of the resulting polyamide is at least 100;
   (b) mixing the catalyst and polyamide at a temperature above the melting temperature of said polyamide under reduced pressure and for a time sufficient to increase the aforesaid ratio of viscosity of the polyamide to at least 100;
   (c) extruding the resulting polyamide into shaped form and quenching said polyamide.

2. A process according to claim 1 wherein the polyamide is made from an aliphatic dicarboxylic acid and an aliphatic diamine, each having from 2 to 24 carbon atoms.

3. A process according to claim 2 wherein the polyamide has 6 to 12 carbon atoms.

4. A process according to claim 1 wherein the catalyst is admixed with a particulate polyamide having a relative viscosity of from 40 to 70 prior to introducing the admixture to an apparatus for melting said polyamide.

5. A process according to claim 1 wherein the polyamide, having a relative viscosity of from 40 to 70, is melted in an extrusion apparatus and the catalyst is added to the molten polyamide.

6. A process according to claim 1 wherein the admixture is extruded using an extrusion apparatus and said apparatus is vented such that the pressure that the polyamide experiences is less than about 13.33 kilopascals.

7. A process according to claim 6 wherein the pressure is less than about 8 kPa.

8. A process according to claim 1 wherein the catalyst is phosphoric acid in the amount of from 0.01 to 1.5 wt. %.

9. A process according to claim 1 wherein the catalyst is ortho- or meta-phosphoric acid in an amount of from 0.05 to 0.2 wt. %.

10. A process according to claim 1 wherein the polyamide is formed into film using a blown film process.

* * * * *